March 4, 1969 E. H. BERGMAN 3,430,626
SELF-TRIGGERED VETERINARY ATTACHMENT
Filed Aug. 8, 1966 Sheet 1 of 2
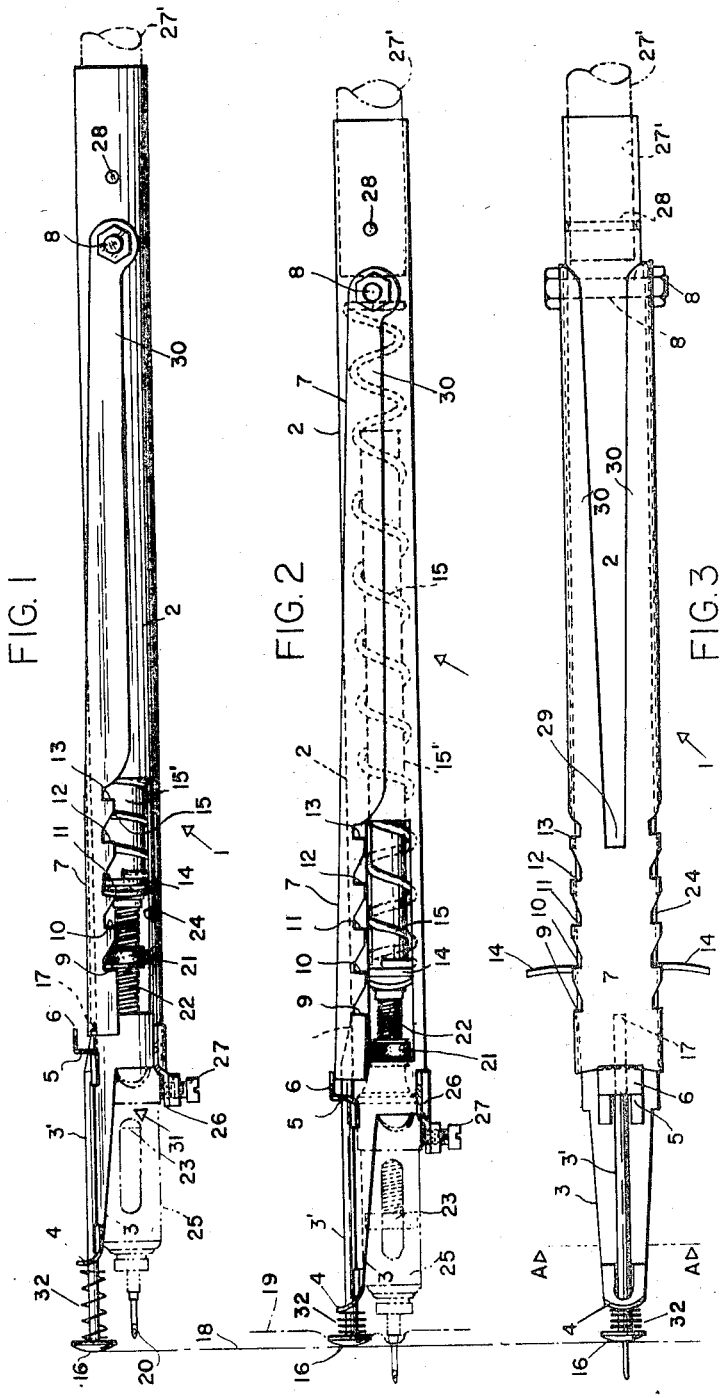
INVENTOR
Euck. H. Bugman March 4, 1969  E. H. BERGMAN  3,430,626
SELF-TRIGGERED VETERINARY ATTACHMENT
Filed Aug. 8, 1966  Sheet 2 of 2

INVENTOR
Erik H Bergman

United States Patent Office 3,430,626
Patented Mar. 4, 1969

3,430,626
SELF-TRIGGERED VETERINARY ATTACHMENT
Erick H. Bergman, Cereal, Alberta, Canada
(R.R. 2, Lumby, British Columbia, Canada)
Filed Aug. 8, 1966, Ser. No. 571,065
U.S. Cl. 128—218          3 Claims
Int. Cl. A61m 5/20; A61d 7/00

ABSTRACT OF THE DISCLOSURE

A tubular apparatus that will hold and automatically discharge a veterinary syringe on contact by means of a compressed spring which is actuated by a trigger mechanism, with provision for adding an extension member to facilitate the remote injection of an animal.

---

This invention relates to a self-triggered veterinary attachment for containing and operating instruments.

The primary object of the said attachment is to provide means of administering fluid medication hypodermically without requiring the patient to be physically restrained such as by being bound or contained by a shute, and to enable an operator positioned, for example, on a horse to select the patient site and administer the dose while in pursuit of an actively evasive patient.

A still further object of the said attachment is to provide a contact head covered by a detachable embossed and resilient material to present a gripping surface resistant to lateral displacement of the contained instrument while in operation.

A yet further object is to provide means of extending the length of the apparatus by the sleevable engagement of a staff by a recess in the said attachment.

It is considered advisable to describe briefly the conditions which are commonly met with when administering by hypodermic means tranquilizing, immunization, prophylactic doses or as the case might be, particularly to cattle. After the first experience of treatment, animals tend to become more wary and at the first suspicious sign to take immediate evasive action. The physical containment of a frightened animal is often attended by the risk of injury both to the operator and to the animal itself, and the residual muscular action of which even the most rigidly secured animal is capable in response to the sudden sensation induced by the introduction of the needle is sometimes sufficient to frustrate the operator and, sometimes, to cause the needle to be broken off at the site where it will work into a position of inaccessibility unless immediate steps are taken to remove it. I dismiss the use of missiles for hypodermic treatment as objectionable on the grounds of the uncertainty of various factors, including the fallibility of the propulsive means and of marksmanship. It is clear that a misdirected missile of the character under consideration, penetrating the udder, damaging bony structure, or some other vulnerable part, could result in serious injury to, or the complete loss of a valuable animal; not to mention the infliction of needless suffering.

I have found, by practical experience, that the ideal and safe approach under range conditions to a selected animal patient is from horseback, whence the site can be found and the hypodermic needle directed thereto with a high degree of accuracy by means of an attachment which can be carried and employed in very much the same way as the lance of a cavalry soldier. This, while enabling a fleeing animal to be overtaken, necessarily causes it to present the most favourable site for hypodermic penetration: the fleshy portions of the hind quarters. With my attachment, the trigger contacts the site slightly in advance of the needle or simultaneously depending on length of needle and, in causing the dose to be ejaculated into the tissues, regulates the depth of penetration and shields the needle against being broken. Animals seeking to escape—especially bulls—will make for any stretch of water. To an operator able to administer the dose from horseback, this no longer offers any obstacle.

In drawings which illustrate embodiments of the invention,

FIG. 1 is a side view of the attachment containing a hypodermic syringe (seen in phantom lines), cocked and ready to operate said syringe.

FIG. 2 is the same view but with the trigger sprung and the dose evacuated.

FIG. 3 is a top view of the invention showing the bifurcated trigger-stop lever pivotally contained by a pin which extends on both sides of the housing.

Figure 4:
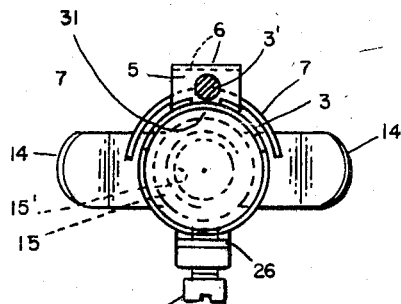
FIG. 4 is a cross sectional view taken through trigger arm at A—A.

1, FIG. 1, is the total assembly as seen from one side, 2 is the housing of which mount 3 of trigger 3' is an extension and contains trigger guides 4 and 5, respectively; trigger guide 5 being provided with a projection 6 in order to contain the upward movement of lever 7 which is pivotal about pin 8 and provided with trigger stops 9, 10, 11, 12, 13; the said trigger stop 11 is shown in the position of intercepting cocking lug 14 in opposition to coil spring 15; the said coil spring 15 being contained by aligning rod 15' within the limits of its travel in the direction of decompression when the said trigger 3' is constrained by force applied at contact head 16 to intercept its tapered end 17 between the end of said lever 7 and the top of said housing 2, the effect is to pivot lever 7 about pivot pin 8 enough to disengage whichever of the said trigger stops 9, 10, 11, 12 or 13, as the case might be, then containing said cocking lug 14, against the constraint of said coil spring 15. In FIG. 1 this is seen to be stop 11, and in FIG. 2 the effect of triggering is apparent by comparison of the relative positions of the contact head 16 in FIGS. 1 and 2 with respect to the datum line 18. However, the yielding nature of the animal's body would probably be more accurately represented, at the side of penetration, by the line 19 and the needle 20.

The full penetration of the needle and withdrawal can be swiftly accomplished while ensuring the administering of the full dose intended. But it is an important feature of my invention that the ejaculation of a full dose does not necessarily entail evacuation of the syringe itself. A given dose can be predetermined by setting regulating fingerpiece 21 which by means of the threaded piston stem 22 can be set forward or backwards along the said stem to stop the piston 23 at the point desired to arrest the flow of fluid and thereby complete the required injection. The said fingerpiece 21 is accessible for manual regulation by means of aperture 24 in the said housing 2, enabling whatever remaining fluid there may still be in the said chamber 25 to be apportioned into repeated doses, without recharging, up to the limit of the capacity of the chamber 25.

Chamber 25 is shown in phantom lines because it does not form part of my invention but is introduced for the purpose of illustrating the application of the attachment which I have invented to enable hypodermic applicators of varying sizes and manufacture to be interchanged and used by housing lug 26 which enables set screw 27 to be accommodated for the purpose of containing an applicator (hypodermic syringe, for example) or, alternatively, enabling an applicator to be removed and replaced. The said trigger mount 3 serving the double purpose of containing trigger guides 4 and 5 and, in combination with said set screw 27, the required instrument also.

When it is required to add extension to the said attachment, when it is to be used, for example, from horseback, the tubular shape of housing 2 at the relevant portion thereof provides a convenient recess for the containment of a suitable stick or staff 27' of required diameter and length. The said stick or staff being further contained by the pin 28.

FIG. 3 is a plan view of the said attachment 1 as projected on FIG. 2 showing, particularly, the bifurcation 29 of said lever 7 by which the pivot arms 30, 30, are developed to engage pivot pin 8; the said bifurcation being for the purpose of easing the movement of said lever within the limits of the arc of travel in response to the operation of trigger 17.

FIG. 4 is cross-section taken at A—A showing the instrument recess 31, but with the instrument omitted.

Spring 32 (FIGS. 1, 2 and 3) is sleevably contained by trigger 3' between contact head 16 and trigger guide 4 for the purpose of ensuring that the said head 16 is held in positive contact with the patient site throughout penetration and withdrawal of an instrument.

Figure 5:
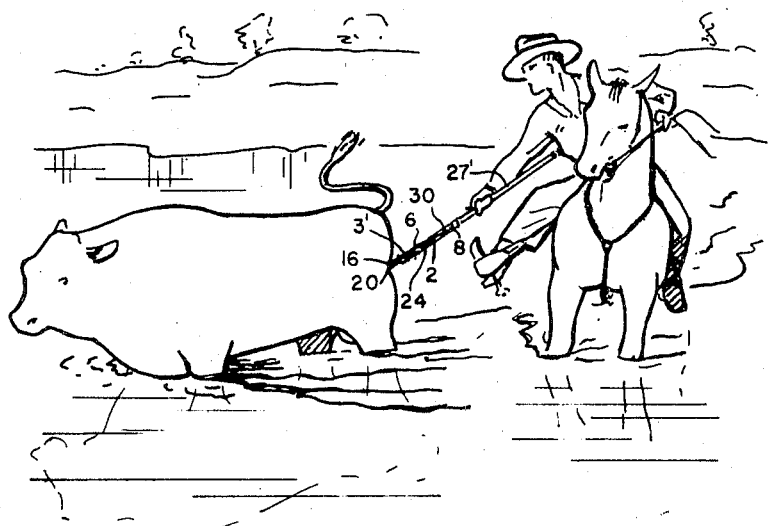
FIG. 5 is a view of a typical example of administering treatment from horseback to an animal that has waded out into water.

FIG. 5 is a view showing the attachment 1 in use when elongated by the installation of staff 27, the site being reached with a high degree of exactitude, and the treatment effected swiftly and efficiently.

Figure 6:
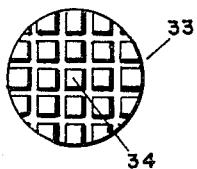
FIG. 6 is attachable accessory.

Protective accessory 33, FIG. 6, is attachable and detachable with respect to said contact head 16 and is embossed 34 to reinforce positive contact of the said attachment adjacent a patient site and thereby resist any tendency by laterally applied stress to break an included portion of an instrument while administering a dose.

Figure 7:
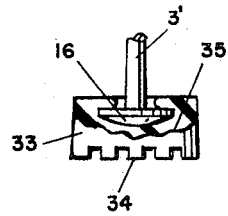
FIG. 7 is view rotated 90° with respect to FIG. 6.

FIG. 7 is a view of said protective accessory 33 rotated 90° with respect to FIG. 6 and broken away at 35 to show method of engaging with the said contact head 16.

It will be apparent from the foregoing disclosure that the fewness of working parts, the simplicity and inexpensiveness of the embodiments of said attachment 1, amount to a distinct and valuable improvement upon veterinary accessories of comparable character presently available.

The foregoing disclosure describes a favoured but not necessarily exclusive application of the said invention.

I claim:

1. An attachment for containing and operating instruments, said instruments being for the purpose of administering fluid medication hypodermically, said attachment comprising a housing, a trigger mount attached to said housing; a trigger slidably mounted upon said trigger mount, said trigger having a contact head adapted to extend with respect to the needle of a contained hypodermic instrument, a lever pivotally mounted to the housing, a spring actuated cocking lug mounted within the housing, and a plurality of pairs of stops formed on said lever whereby the contact of said forwardly extending contact head with a patient site causes said trigger to move rearwardly and thereby causes said lever to move pivotally and thus disengage said spring-actuated cocking lug from one pair of said plurality of pairs of stops which are formed on said lever whereby said hypodermic instrument is actuated; said housing being apertured to provide access for the manual adjustment of an adjustable portion of a hypodermic instrument, which portion is adapted to extend into and be contained by said housing adjacent rearwardly of the said trigger mount, and means to permit extension of the length of said housing by engagement of said housing with a staff.

2. An attachment as defined in claim 1 for containing and positioning instruments for administering hypodermic injections of fluid medication wherein said means for permitting extension of the length of the apparatus is a recess for sleevable engagement with a staff whereby the patient site can be selected and the dose controllably administered by an operator positioned, for example, on horseback.

3. An attachment for containing instruments for the purpose of administering fluid medication hypodermically as defined in claim 1 wherein said contact head has an accessory of resilient material which is attached to and detachable from said contact head; said accessory being embossed to form a gripping surface when in contact with the patient and thereby resist lateral displacement from the point of penetration when the instrument is operating and thus lessen the risk of leaving a portion of said needle in the patient.

References Cited

UNITED STATES PATENTS

| | | | |
|---|---|---|---|
| 2,821,981 | 2/1958 | Ziherl et al. | 128—173 |
| 3,006,649 | 10/1961 | Gesick et al. | 128—216 X |
| 3,114,370 | 12/1963 | Kayler | 128—218.2 |

RICHARD A. GAUDET, *Primary Examiner.*

MARTIN F. MAJESTIC, *Assistant Examiner.*